United States Patent [19]
Roth

[11] 3,935,759
[45] Feb. 3, 1976

[54] DEVICE FOR BARING INSULATED ELECTRICAL CONDUCTOR WIRE AND STRANDED WIRE

[76] Inventor: Paul Roth, Route de Giez, 1411 Les Tuileries-de-Grandson, Switzerland

[22] Filed: Nov. 20, 1974

[21] Appl. No.: 525,681

[30] Foreign Application Priority Data
Nov. 20, 1973 Switzerland.................... 16328/73

[52] U.S. Cl. ............................................. 81/9.51
[51] Int. Cl.² ........................................ H02G 1/12
[58] Field of Search ......................... 81/9.5 R, 9.51

[56] References Cited
UNITED STATES PATENTS
3,168,845  2/1965  Kleimer et al. .................... 81/9.51

Primary Examiner—Al Lawrence Smith
Assistant Examiner—Roscoe V. Parker
Attorney, Agent, or Firm—Brady, O'Boyle & Gates

[57] ABSTRACT

A second surface member is supported for movement over and relative to a first surface member in closely spaced relation wherein a long conductor gripping section on the second surface member is movable over an equal-sized long conductor gripping section on the first surface member, and a shorter conductor gripping section on the second surface member is movable over an equal-sized shorter conductor gripping section on the first surface member. A knife protrudes an adjustable amount above the surface of one of the surface members between the longer and shorter gripping sections and at least in the area of the shorter gripping section, such that an insulated conductor placed laterally of one end of the gripping sections on the first surface member is rolled over the knife between the longer and shorter gripping sections of the respective surface members by movement of the second surface member over the first surface member to circumcise a piece of insulating sheathing from the remaining insulation on the wire, whereby further relative movement of the surface members when the insulated wire reaches the end of the shorter gripping sections clamps the insulated wire against further rolling and allows the longer conductor gripping sections to continue to roll the circumcised piece of sheathing relative to the remaining insulating sheathing and wire to positively separate the two and strip the cut piece of sheathing from the wire as it is withdrawn laterally from between the two surface members.

14 Claims, 4 Drawing Figures

DEVICE FOR BARING INSULATED ELECTRICAL CONDUCTOR WIRE AND STRANDED WIRE

The invention relates to a device for baring electrical conductor wire and stranded wire.

The device in accordance with the invention is characterised in that an equal-sized gripping section of a second surface is movable over a longer lamellar gripping section of a first surface and an equal-sized gripping section of the second surface is movable over a shorter lamellar gripping section of the first surface running near an end section of the longer gripping section of the first surface in the longitudinal direction of these surface sections, and in that between the longer and the shorter gripping section of the first or second surface there runs a slot from which a knife projects by an adjustable amount, the cutter of which extends in the area of the shorter gripping surface section at least, the whole such that an end piece of an insulated wire or stranded wire projecting over the knife on the side of the longer gripping surface section can first be rolled over the knife through the movement of the second surface between the longer and shorter gripping surface sections, after which the piece of sheathing thereby circumcised from the remaining insulating sheathing can be rolled on between the longer gripping surface sections, thereby turned relative to the wire or stranded wire, the latter snaked and lastly the end of wire or stranded wire drawn out of the cut piece of insulating sheathing.

In the following two embodiment examples of the object of the invention are described in greater detail on the basis of the attached drawing, in which.

Figure 2:
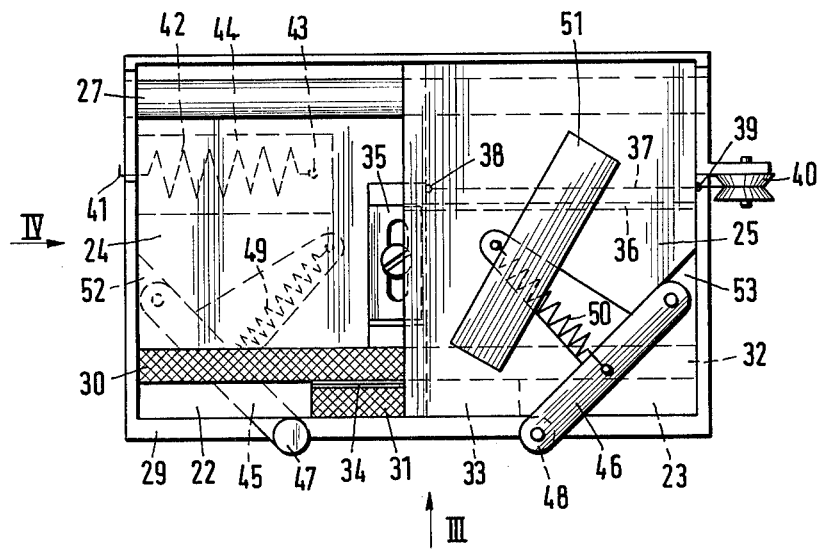
FIG. 2 is a plan view (in the direction of arrow II in FIGS. 3 and 4) of a second form of embodiment.
Figure 3:
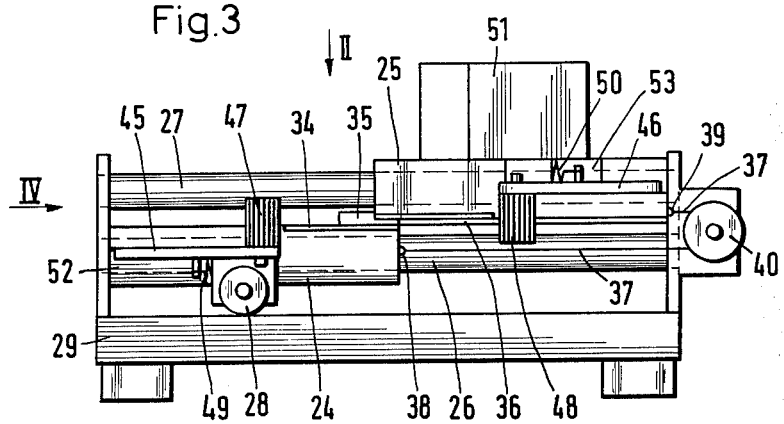
Figure 4:
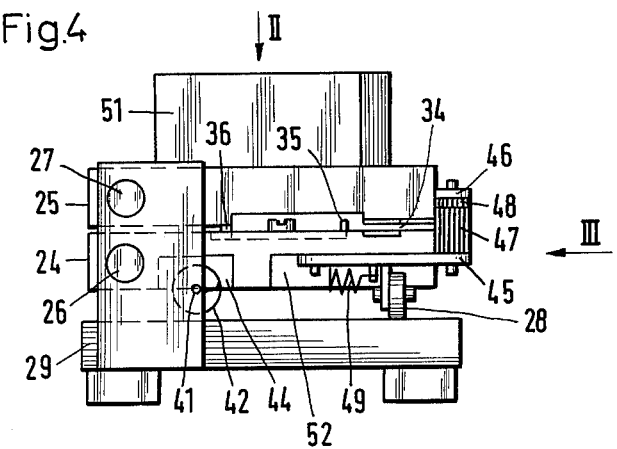

FIG. 3 a vertical projection (viewed in the direction of arrow III in FIGS. 2 and 4) of the second form of embodiment;

FIG. 4 a side elevation (viewed in the direction of arrow IV in FIGS. 2 and 3) of the second form of embodiment.

Figure 1:
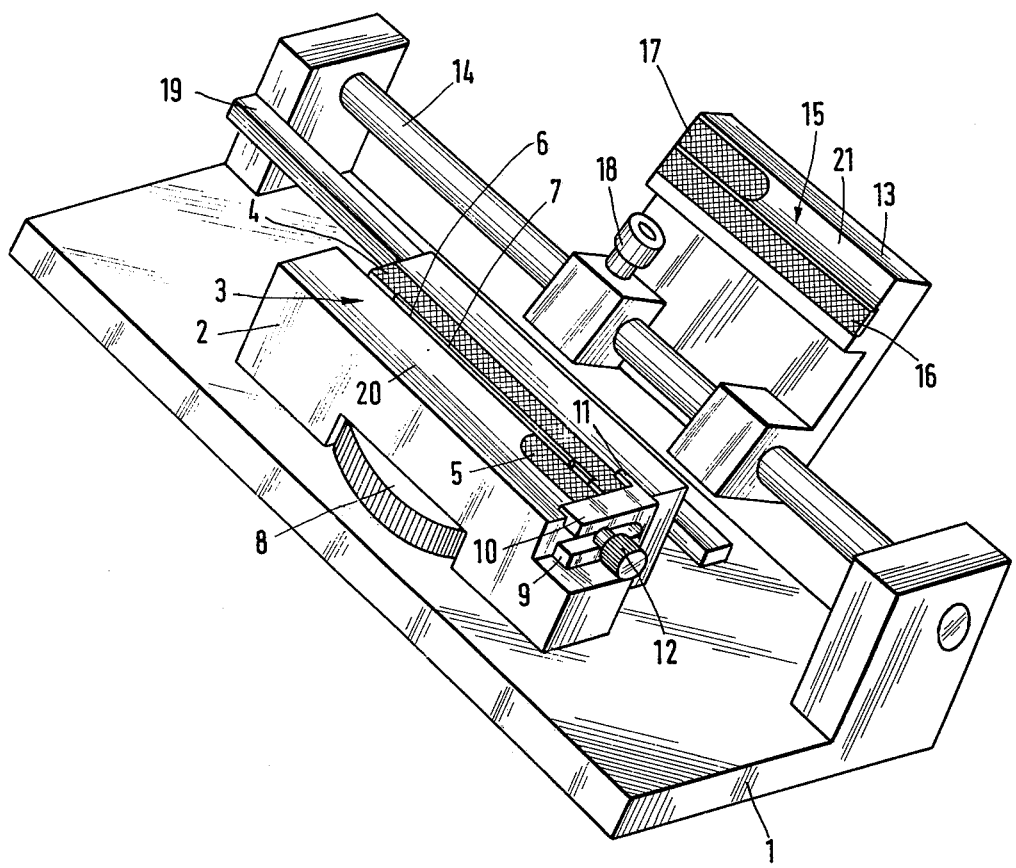
FIG. 1 is a perspective view of a first form of embodiment.

In the first form of embodiment as in FIG. 1, on a base plate 1 a table plate 2 is secured, the table surface 3 of which serves as support for an end section of a conductor wire or stranded wire to be bared at the extreme end (not shown). The table surface 3 has a longer lamellar gripping surface section 4 and a shorter, likewise lamellar gripping surface section 5, which runs near a right-hand in the drawing) end section of the longer lamellar gripping surface section 4. The surface section 5 is at least as long as the external circumference of the thickest wire or stranded wire to be bared. Between these two surface sections 4 and 5 there runs a slot 6 in which a knife 7 is diposed, which has a sharp cutter in the area of the shorter surface section 5 and a blunt one for the rest. The knife 7 projects above the surface of the table 3 by an adjustable amount. Adjustment is provided by an adjusting disk 8 which can be screwed up or down by means of a threaded spindle not shown, and at the top face of which the knife 7 is pressed by springs not shown. At the right-hand (in the drawing) ends of the lamellar gripping surface sections 4 and 5 a rectangular stop angle 9 for the end of the wire or stranded wire is disposed. One arm 10 of the stop angle 9 runs transverse to the longitudinal direction of the surface sections 4 and 5, the other arm 11 is located at the side of the knife 7 on which the longer surface section 4 extends. The stop angle 9 is adjustable at right angles to the longitudinal direction of the gripping surface sections 4 and 5 and is fixable in position by means of a locking screw 12.

A plate 13 is mounted on one round guide bar 14 in a displaceable and pivotable manner. The guide bar 14 is attached at a distance from the base plate 1 parallel with the lamellar gripping sections 4 and 5 of the table surface 3 so that the plate can be pivoted into a practically horizontal position in which its lower face 15 is separated from the table surface 3 by a distance corresponding to the diameter of the conductor wire or stranded wire to be bared. Just like the table surface 3 the face 15 of the plate 13 has a longer and a shorter lamellar gripping surface section 16 and 17. The shorter surface section 17 runs near a left-hand (in the drawing) end section of the longer surface section 16. Each of these surface sections 16 and 17 is equal in size to the corresponding part 4 and 5 respectively of the table surface 3, and they are so arranged that each of these gripping sections 16 and 17 of the plate face 15 runs over the corresponding gripping section 4 and 5 respectively of the table surface 3 when the plate 13 is moved along the guide bar 14 over the surface of the table. In this a guide roller 18 connected with the plate 13 and running on a rail 19 ensures a minimum clearance between the table surface 3 and the plate face 15 so that the gripping surface sections 4, 5 and 16, 17 cannot slide together and the knife 7 cannot strike against the plate face 15 in its highest position. The table surface 3 or plate face 15 outside the shorter surface section 5 or 17 is smooth on the side of the longer gripping surface section 4 or 16 on which the shorter gripping surface section 5 or 17 runs. These smooth surface sections are marked in the drawing at 20 and 21. The range of displacement of the plate 13 is so great that opposed ends of the surface sections 4 and 16 can be made to coincide.

To bare an electrical conductor wire or a stranded wire the stop angle 9 is so adjusted that the lateral distance between its arm 11 and the knife 7 corresponds to the length to be bared on the end of the wire. The plate 13 is moved fully to the right in the swung-up attitude shown, the end of the conductor wire or stranded wire is placed in the stop angle 9 laterally of gripping sections 4 and 5 so its end abuts the arm 11, and then the plate 13 is folded down forwards, through which the left-hand (in the drawing) ends of the gripping sections 16 and 17 of the plate face 15 press over the right-hand (in the drawing) ends of the gripping sections 4 and 5 of the table surface 3 onto the conductor wire or stranded wire. Then the plate 13 is moved to the left. Through this the conductor wire or stranded wire is rolled over the knife 7 between the gripping surface sections 4, 5, 16, 17. In so doing, the knife 7 cuts around into the insulating sheathing up to or almost up to the wire or stranded wires, the cutting pressure being exerted by the correspondingly gauged weight of the plate 13. On further movement of the plate 13 only the longer gripping surface sections 4 and 16 hold onto the cut end of the insulating sheathing, while the wire or stranded wire left slides between the smooth surface sections 20 and 21. Through this, only the cut end of the insulating sheathing is turned further, this, if it has not been cut away completely, being separated from the adjacent sheating through this twisting movement and, in the case of a stranded wire, the separate strands are snaked together. During or after this process the bared end of the conductor wire or stranded wire is drawn out of the device, for which the longitudinal section of the knife 7, in which the cutter is blunt, serves as a stripper and cannot cut into the wire or separate strands of the stranded wire any further due to the cutter being blunt.

In the second form of embodiment as in FIGS. 2 to 4 the surfaces 22 and 23 corresponding to the surfaces 3 and 15 in FIG. 1 are arranged with two plates 24 and 25 disposed one above the other. The plates 24 and 25 are movable relative to one another with necessarily opposed identical movements. This results in the wire or stranded wire rolling "on the spot" between the plates, i.e. rotating about a stationary axis when the plates for baring the wire or stranded wire are moved against one another. This makes it possible to appply simple grippers which are operated by the movement of the plates to draw the wire or stranded wire out of the device automatically when the piece of insulating sheathing to be removed is cut through and twisted about the conductor.

Each of the plates 24 and 25 is movable on a round bar 26 and 27 and pivotable thereon. The lower plate 24 is fitted with a caster 28 which runs on the base plate 29 of the device parallel with the round bars 26 and 27. On the facing surfaces of the plates 24 and 25 there are gripping surface sections 30 to 33 which correspond to the gripping surface sections 4, 5, 16 and 17 described in connection with FIG. 1. A knife 34 corresponding to the knife 7 in FIG. 1 and a stop 35 corresponding to the stop 9 in FIG. 1 are disposed on the lower plate 24. A stop rail 36 at the underside of the upper plate 25 abuts the top of the lower plate 24 and prevents the gripping surfaces 30, 31 of the lower plate 24 coming against the gripping surfaces 32, 34 of the upper plate 25 and the knife 34 striking against the upper plate 25 when there is no wire or stranded wire between the plates 24 and 25.

A thin plastic thread 37 is attached to the plate 24 at one end at 38 and to the plate 25 at the other end at 39, it runs over a fixed pulley 40 and otherwise parallel to the round bars 26 and 27. A tension spring 42 mounted statically at 41 is secured at 43 to the lower plate 24 and tends to hold the latter in the left-hand end position shown in the drawing, whereby the upper plate 25 is located in the right-hand end position shown. The spring 42 is disposed in a lower recess 44 of the plate 24.

On the underside of the lower plate 24 and on the top of the upper plate 25 one arm 45 and 46 respectively is located in a cavity 52 and 53 respectively in a pivotable manner, the free end of which projects over the front (in FIG. 4 right-hand) edge of the plate and carries a gripping element 47 and 48 respectively which projects over the upper surface of the lower plate 24 and the lower surface of the upper plate 25 respectively. Each arm 45 and 46 is under the influence of a tension spring 49 and 50 respectively also located in the cavity 52 and 53 respectively and which tends to pivot the arm into the position shown in the drawing in which the gripping element 47 and 48 is located in the position of the edge of the plate 24 and 25 respectively which is close to the end of the shorter gripping surface section 31 and 33 respectively which lies between the ends of the longer gripping surface section 30 and 32 respectively. The arms 45 and 46 are disposed symmetrically in relation to one another and the turning moments exerted by the springs 49 and 50 on the arms 45 and 46 are directed against one another and reciprocally identical. On the upper side of the upper plate 25 a handle 51 is mounted to move the former and with it the lower plate 24.

In order to bare an electrical conductor wire or a stranded wire with the device as in FIGS. 2 to 4, the end of the wire or stranded wire is rolled between the plates 24 and 25 as described in connection with FIG. 1 with reference to the table plate 2 and the plate 13. As soon as the end of the wire or stranded wire is located between the left-hand (in the drawing) end of the shorter gripping surface section 31 and the right-hand end of the shorter gripping surface section 33, the gripping elements 47 and 48 grasp opposite sides of the wire or stranded wire and hold it firmly. While in the course of further movement of the plates 24 and 25 the piece of insulating sheathing now cut is turned further between the longer gripping surface sections 30 and 32, the gripping elements 47 and 48 draw the end of the wire or stranded wire out of the device because the arms 45 and 46 now swing apart, the gripping elements 47 and 48 moving away from the front (in the drawing) edge of the plates 24 and 25. Through this, the conductor of the wire or stranded wire is drawn out of the cut rotating piece of sheathing (in the case of stranded wire the latter is snaked together in the process), the piece of insulating sheathing being held between the gripping surface sections 30 and 32 and the adjacent part of the insulating sheathing however being able to slide over the smooth surfaces 22 and 23.

Instead of the parts 37, 40 and 42 each plate can be fitted with a toothed rack which is disposed in each case on either side of a cog rotatable about a stationary axis and meshes with it (not shown).

Expediently the gripping sections of the table surface and the plate surface have a multitude of cutters acting like file strokes (particularly double cuts). Pieces of files for example could be inserted in suitable cavities in the table plate 2 and the plate 13 or the plates 24 and 25.

The knife 7 or 34 can be an electrically heatable knife in the area of the shorter gripping surface section 5 or 31 respectively, since most materials for insulating sheathing are ideal for thermic cutting. Thermic cutting has the advantage that the knife can also be so blunt in its cutting section (not only serving as a stripper) that it cannot damage the wire or stranded wire in any way whatsoever.

The cutting pressure can be adjusted for example by means of a weight which is displaceable on the plate 13 or 25 transverse to its guide bar.

With a variant not shown of the device as in FIGS. 2 to 4, gripping surface sections are formed on the circumference of wheels drivable at the same peripheral speed and in the same direction of rotation, and the gripping elements are operated and controlled by the belt or cog drive.

In an embodiment with an electrically heatable knife, a knife carrier with an electric heating element can be disposed as in the example shown in FIGS. 1 or 2 and 3 on the right near or under the plate 2 or 24. The knife projects from this carrier and runs freely into the plate and out on top. With all forms of embodiment the stripper mentioned in connection with FIG. 1 can be provided. Knives and/or strippers can be provided on the lower or the upper or even both on the lower and the upper plate. A shorter path of movement suffices when there are knives on both plates.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A device for baring electrical conductor wires and stranded wires, comprising a first surface and a second surface movable over and relative to said first surface, an equalsized gripping section (16;32) on said second surface is movable over a longer lamellar gripping section (4; 30) on said first surface and an equal-sized gripping section (17; 53) on said second surface is movable over a shorter lamellar gripping section (5; 31) on the first surface positioned and running near an end portion of the longer gripping section (4; 30) of said first surface in the longitudinal direction of these surface sections (4, 5, 16, 17; 30, 31, 32, 33), a knife (7; 34) positioned between the longer and the shorter gripping section (4 and 5; 30 and 31) of the first and/or second surface and projecting an adjustable amount above said surface, said knife having a cutter portion which extends at least in the area of the shorter gripping surface section (5; 31) whereby an end piece of an insulated wire or a stranded wire projecting laterally over the knife (7; 34) on the side of the longer gripping surface section (4; 30) can first be rolled over the knife (7; 34) through the movement of the second surface between the longer and shorter gripping surface sections (4, 5 and 16, 17; 30, 31 and 32, 33), after which the piece of sheathing thereby circumcised from the remaining insulating sheathing can be rolled on between the longer gripping surface sections (4 and 16; 30 and 32), thereby turned relative to the wire or the stranded wire, the latter snaked and lastly the end of wire or stranded wire drawn out of the cut piece of insulating sheathing.

2. A device as in claim 1, in which said first and second surface each have an area (20, 21; 22, 23) adjacent to the shorter gripping surface section (5, 17; 31, 33) running near the longer gripping surface section (4, 16; 30, 32) that is smooth.

3. A device as set forth in claim 1, in which said knife extends over the entire area of the longer gripping surface section and has a sharp cutter portion in the area of the shorter gripping surface section and a blunt portion elsewhere.

4. A device as set forth in claim 1, in which said knife has a blunt cutter portion in the area of the shorter gripping surface section and is electrically heatable.

5. A device as set forth in claim 1, including a stop angle (9; 35) disposed near the adjacent ends of one shorter and one longer gripping surface section (4, 5; 30, 31), and being adjustable transverse to the longitudinal direction of the gripping surface sections and lockable in position.

6. A device as set forth in claim 1, in which the gripping surface sections (4, 5, 16, 17; 30, to 33) are formed with a multitude of cutters operating in the fashion of file strokes.

7. A device as set forth in claim 1 including a plate member (13; 25) carrying said second surface having a shorter and a longer gripping surface section (16, 17; 32, 33), a guide bar (14; 27), said plate member mounted to move and pivot on said guide bar and fitted with a roller (18) or a stop (36) which respectively ensure a minimum separation from said first surface having the other shorter and longer gripping surface sections (5, 4; 31, 30).

8. A device as set forth in claim 1 including a table member (3) and a plate member (13), said first surface carried by said table member (3) and the second surface (15) carried by said plate member (13), and said plate member guided displaceably relative to the table member in the longitudinal direction of the lamellar gripping surface sections (4, 5, 16, 17).

9. A device as set forth in claim 1, in which said first surface and said second surface are respectively formed on two plate members (24, 25) which are displaceable relative to one another with necessarily opposed identical movements.

10. A device as in claim 9, in which both plate members (24, 25) are attached to parts, running parallel with the direction of displacement, including a pulling means (37) running about a stationary deflection roller (40) and which runs endlessly over two deflection rollers or is connected at one end (38) with one plate member (24) and at the other end (39) with the other member (25) and kept taught by a spring (42).

11. A device as in claim 9, in which said two plate members are each fitted with a toothed rack which mesh opposite one another with a cog rotatable about a stationary axis.

12. A device as in claim 9, including a gripping element (47, 48) projecting over the side edge of each plate member (24, 25) adjacent the shorter gripping surface sections (31, 33), each said gripping element is attached to the end of an arm (45, 46), mounted pivotally on the other side of the plate, spring means (49, 50) engaging each said arm tending to urge the gripping elements against one another and force each gripping element to adopt the position at the edge of the plate which is close to the end of the shorter gripping surface section (31, 33) which lies between the ends of the longer gripping surface section (30, 32), in which the forces exerted by the gripping elements are reciprocally opposed and identical.

13. A device as set forth in claim 1, in which said gripping surfaces are formed on the circumference of rollers drivable with the same direction of rotation and the same peripheral speed.

14. A device as in claim 13, including near the edges of the surfaces of the rollers, to which the shorter gripping surface sections are adjacent, a gripping device is disposed controlled by the roller drive, said gripping device having gripping elements which perform a gripping movement to grasp the conductor wire or stranded wire when the shorter gripping surface sections have moved past one another and their gripping elements move away from the edges during the continued movement of the surface, thereby to draw the end of the wire or stranded wire out of the device and thus out of the cut piece of conductor sheathing.

* * * * *